(12) United States Patent
Vudathu et al.

(10) Patent No.: US 12,307,434 B2
(45) Date of Patent: May 20, 2025

(54) SYSTEMS AND METHODS FOR DYNAMICALLY SWITCHING PAYMENT MECHANISMS FOR OUTGOING PAYMENTS

(71) Applicant: JPMORGAN CHASE BANK, N.A., New York, NY (US)

(72) Inventors: Raghu Vudathu, Downingtown, PA (US); Christy Lillie, Ann Arbor, MI (US); Joe Martei, Brooklyn, NY (US); Bodhi Hwang, Forest Hills, NY (US); Justin Dupont, Huntersville, NC (US); Mark Lanter, Woodside, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/058,322

(22) Filed: Nov. 23, 2022

(65) Prior Publication Data

US 2024/0169336 A1 May 23, 2024

(51) Int. Cl.
*G06Q 20/22* (2012.01)
*G06Q 20/10* (2012.01)
(52) U.S. Cl.
CPC .......... *G06Q 20/227* (2013.01); *G06Q 20/10* (2013.01)
(58) Field of Classification Search
None
See application file for complete search history.

(56) References Cited

U.S. PATENT DOCUMENTS 9,342,831 B1 * 5/2016 Davis ..................... G06Q 20/40
2018/0158037 A1 6/2018 Cassel et al.
2019/0057443 A1 2/2019 Kanjlia et al.

OTHER PUBLICATIONS

International Search Report and Written Opinion of the International Searching Authority, dated Feb. 14, 2024, from corresponding International Application No. PCT/US2023/079509.

* cited by examiner

*Primary Examiner* — Scott S Trotter
*Assistant Examiner* — Amit Patel
(74) *Attorney, Agent, or Firm* — GREENBERG TRAURIG LLP

(57) ABSTRACT

Systems and methods for dynamically switching payment mechanisms for outgoing payments are disclosed. A method may include: receiving, by a payment mechanism selection computer program, a payment request from an electronic device associated with a payor to pay a payee comprising payment parameters; presenting, by the payment mechanism selection computer program, a plurality of payment features to the payor electronic device; receiving, by the payment mechanism computer program and from the payor electronic device, a selection of a subset of the plurality of payment features; determining, by the payment mechanism selection computer program, a payor payment intent from the selection of the subset of payment features; selecting, by the payment mechanism selection computer program, a payment mechanism from a plurality of available payment mechanisms that is consistent with the payor payment intent; and executing, by the payment mechanism selection computer program, the payment using the payment mechanism.

19 Claims, 3 Drawing Sheets

SYSTEMS AND METHODS FOR DYNAMICALLY SWITCHING PAYMENT MECHANISMS FOR OUTGOING PAYMENTS

BACKGROUND OF THE INVENTION

1. Field of the Invention

Embodiments generally relate to systems and methods for dynamically switching payment mechanisms for outgoing payments.

2 Description of the Related Art

There are a variety of mechanisms available for a first party to make a payment to second party. Examples include Automated Clearing House (ACH) payments, wire payments, peer-to-peer (P2P) payments (e.g., ZELLE), mailing a check, etc. Each payment mechanism has its advantages and disadvantages, typically with regard to the cost for using the payment mechanism and the speed of the payment mechanism. A party making a payment typically selects the payment mechanism for the payment from an available menu that identifies speed and cost. The party's intent, however, does not always match the payment mechanism selected.

SUMMARY OF THE INVENTION

Systems and methods for dynamically switching payment mechanisms for outgoing payments are disclosed. According to one embodiment, a method for dynamically identifying payment mechanisms for outgoing payments may include: (1) receiving, by a payment mechanism selection computer program, a payment request from an electronic device associated with a payor to pay a payee comprising payment parameters; (2) presenting, by the payment mechanism selection computer program, a plurality of payment features to the payor electronic device; (3) receiving, by the payment mechanism computer program and from the payor electronic device, a selection of a subset of the plurality of payment features; (4) determining, by the payment mechanism selection computer program, a payor payment intent from the selection of the subset of payment features; (5) selecting, by the payment mechanism selection computer program, a payment mechanism from a plurality of available payment mechanisms that is consistent with the payor payment intent; and (6) executing, by the payment mechanism selection computer program, the payment using the payment mechanism.

In one embodiment, the payment request further comprises a payment source, a payment destination, and a payment account.

In one embodiment, the payment destination comprises a payee name and a payee phone number.

In one embodiment, the payment destination comprises a payee checking account routing number and a payee checking account number.

In one embodiment, the payment destination comprises a payee wiring account routing number and a payee wiring account number.

In one embodiment, the plurality of available payment mechanisms are based on the payment destination.

In one embodiment, the payment features comprise a payment speed, a payment cost, a payment recallability, and a payment tracking ability.

In one embodiment, the payor payment intent is predicted using a trained machine learning engine.

According to another embodiment, a non-transitory computer readable storage medium, may include instructions stored thereon, which when read and executed by one or more computer processors, cause the one or more computer processors to perform steps comprising: receiving a payment request from an electronic device associated with a payor to pay a payee comprising payment parameters; presenting a plurality of payment features to the payor electronic device; receiving, from the payor electronic device, a selection of a subset of the plurality of payment features; determining a payor payment intent from the selection of the subset of payment features; selecting a payment mechanism from a plurality of available payment mechanisms that is consistent with the payor payment intent; and executing the payment using the payment mechanism.

In one embodiment, the payment request further comprises a payment source, a payment destination, and a payment account.

In one embodiment, the payment destination comprises a payee name and a payee phone number.

In one embodiment, the payment destination comprises a payee checking account routing number and a payee checking account number.

In one embodiment, the payment destination comprises a payee wiring account routing number and a payee wiring account number.

In one embodiment, the payment features comprise a payment speed, a payment cost, a payment recallability, and a payment tracking ability.

In one embodiment, the payor payment intent is predicted using a trained machine learning engine.

According to another embodiment, a system may include a payor electronic device executing a payor computer program that submits a payment request to pay a payee comprising payment parameters, the payment request comprising a payment source, a payment destination, and a payment account; a plurality of available payment mechanisms; and a payment mechanism selection computer program executed by an electronic device that presents a plurality of payment features to the payor computer program and receives a selection of a subset of the plurality of payment features from the payor computer program, determines a payor payment intent from the selection of the subset of payment features, selects a payment mechanism from a plurality of available payment mechanisms that is consistent with the payor payment intent, and executes the payment using the payment mechanism.

In one embodiment, the payment destination comprises a payee name and a payee phone number.

In one embodiment, the payment destination comprises a payee checking account routing number and a payee checking account number.

In one embodiment, the payment features comprise a payment speed, a payment cost, a payment recallability, and a payment tracking ability.

In one embodiment, the payor payment intent is predicted using a trained machine learning engine.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for dynamically switching payment mechanisms for outgoing payments. Embodiments may separate the payor's intent for making a payment, such as the speed for making the payment, the cost for making the payment, and the fraud exposure for the potential payment, from the selection of the payment mechanism.

Once the payor identifies the payor's intent, a payment mechanism selection computer program selects one or more payment mechanisms for the payment. In one embodiment, in situations where the payor has selected a payment mechanism, the payment mechanism selection computer program may dynamically change the payment mechanism to one that meets the payor's intent.

For example, embodiments may receive a request to pay a payee. Using a check from the payee, embodiments may scan the check for routing and account numbers, account holder names, etc. Using this information, embodiments may identify an account with a different payment mechanism (e.g., a P2P account) and may switch the payment to a P2P payment.

As another example, embodiments may receive a request for a billpay payment, and may receive the payee's name, address, and phone number. Using this information, embodiments may identify an account with a different payment mechanism (e.g., a P2P account) and may switch the payment to a P2P payment.

As another example, embodiments may receive a request for a wire payment, and may receive the routing number and account number for the wire payment. Using this information, embodiments may identify an account with a different payment mechanism (e.g., a P2P account) and may switch the payment to a P2P payment.

Embodiments may confirm any payment mechanism changes before they are made.

Figure 1:
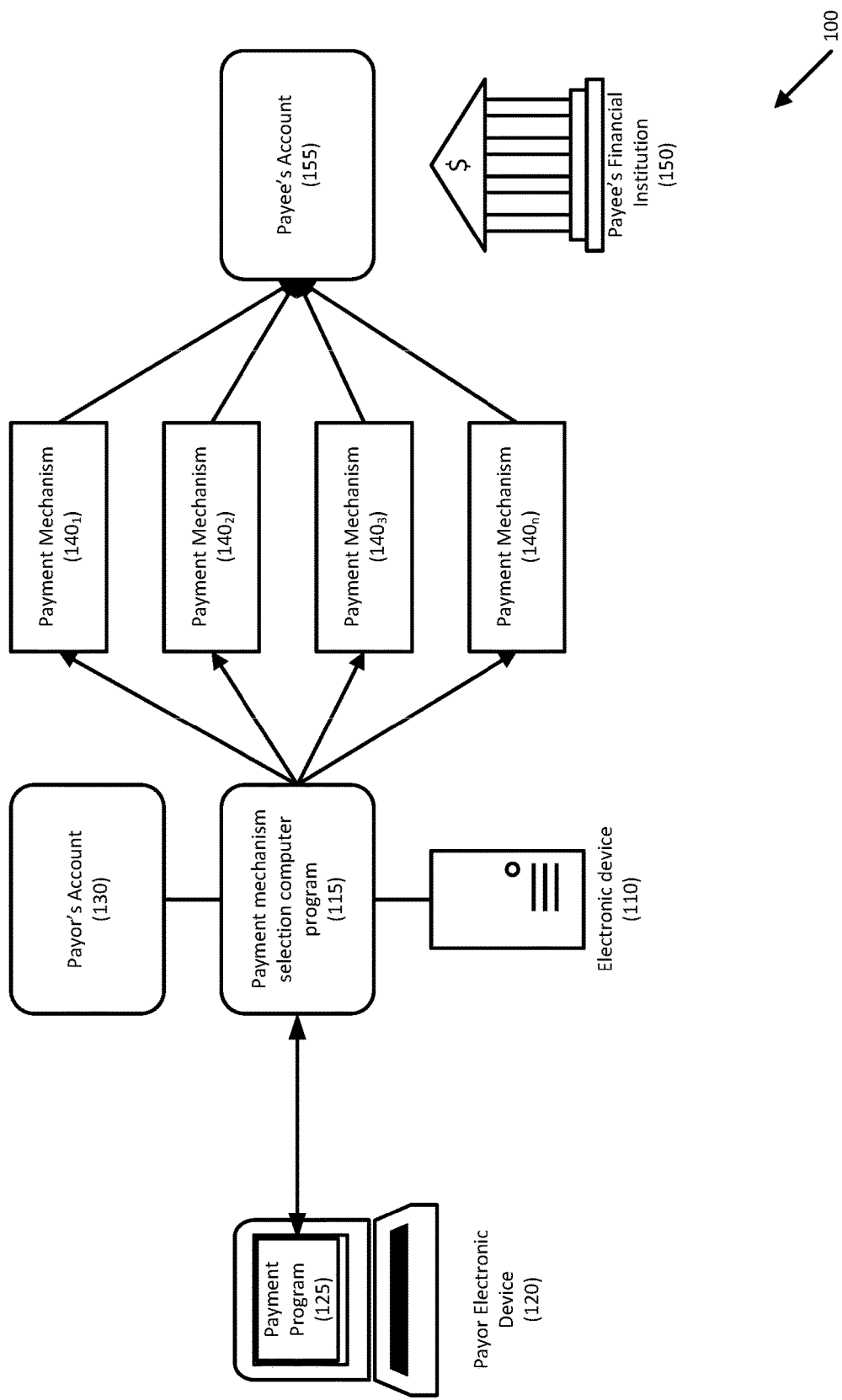
FIG. 1 depicts a system for dynamically switching payment mechanisms for outgoing payments according an embodiment.

Referring to FIG. 1, a system for dynamically switching payment mechanisms for outgoing payments is disclosed according to an embodiment. System 100 may include electronic device 110, which may be a server (e.g., physical and/or cloud based), a workstation, a desktop computer, etc. Electronic device 110 may be provided by a financial institution, a FinTech, etc.

Electronic device 110 may execute payment mechanism selection computer program 115. Payment mechanism selection computer program 115 may receive payment parameters and a payment intent from a payor via payment program 125 executed by payor electronic device. In one embodiment, payor electronic device 120 may be any suitable electronic device, including computers (e.g., desktop, tablet, notebook, etc.), kiosks (e.g., ATMs, point of sale devices, etc.), smart devices (e.g., smart phones), Internet of Things (IoT) appliances, etc.

Payment program 125 may be a computer program or a computer application that may receive an identification of a payment source (e.g., payor's account 130), a payment destination (e.g., payee's account 155, a payee identifier such as phone number, name, alias, etc.), a payment amount, and a payment intent. In one embodiment, the payment intent may be based on payment speed (e.g., immediate, next day, two-day, etc.), payment cost, payment recallability, payment tracking, etc. In one embodiment, the payor may select one or more payment mechanism features and payment mechanism selection computer program 115 may infer the payor's intent.

In one embodiment, the payor may rank several payment mechanism features and then submit the ranked features to payment mechanism selection computer program. In another embodiment, as certain payment mechanism features are selected, mutually exclusive payment features may be made unavailable for selection (e.g., if the payor identifies fastest speed as a payment feature, the lowest cost option may be removed, grayed-out, etc.).

In one embodiment, payment mechanism selection computer program 115 may execute an algorithm based on the payment mechanism features and may optionally return one or more recommended payment mechanisms for confirmation by the payor.

Payment mechanism selection computer program 115 may route a payment over one or more payment mechanisms $140_1, 140_2, 140_3, \ldots 140_n$. Examples of payment mechanisms 140 include wire, ACH, P2P (e.g., ZELLE), check by mail, electronic check, inter-bank transfer, credit card, debit card, cryptocurrency, blockchain-based payments, etc. It should be recognized that these payment mechanisms are exemplary only and different and/or additional payment mechanisms may be used as is necessary and/or desired.

Embodiments may switch from one payment mechanism to another after the payment has been initiated.

Payee may maintain payee's account 155 with payee's financial institution 150, which may be a bank, a FinTech, etc. Payee's account 155 may receive the payment directly or indirectly from one or more of payment mechanism 140.

Figure 2:
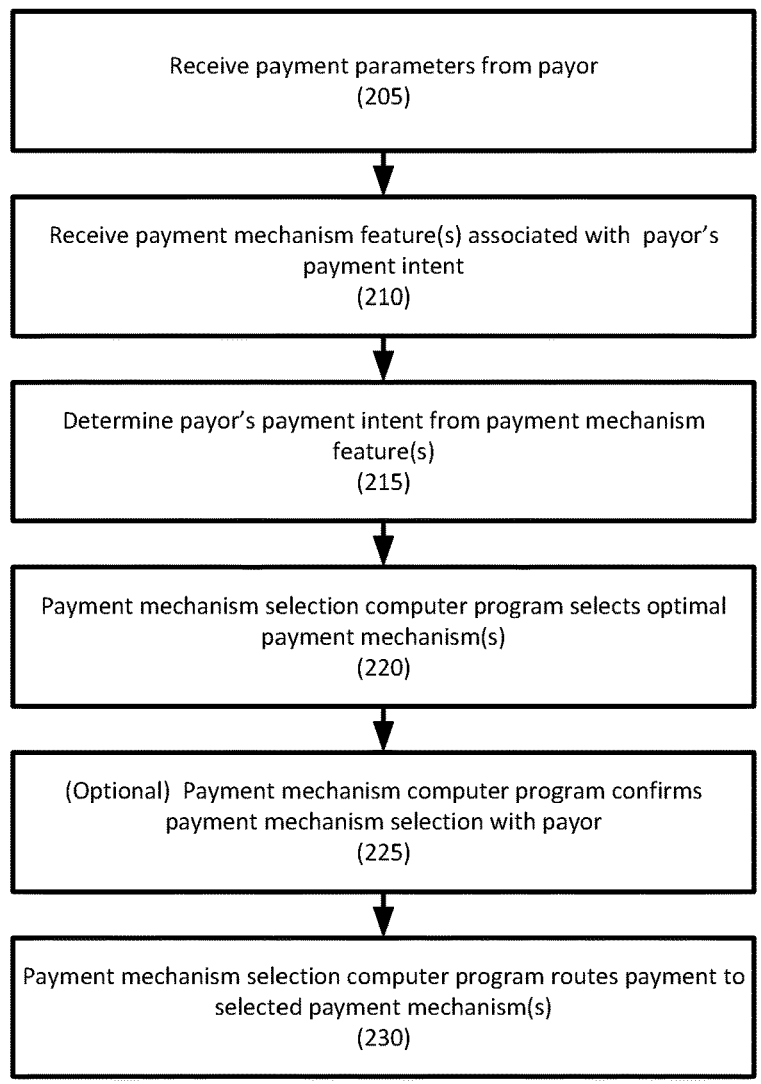
FIG. 2 depicts a method for dynamically switching payment mechanisms for outgoing payments according an embodiment.

Referring to FIG. 2, a method for dynamically switching payment mechanisms for outgoing payments is disclosed according to an embodiment.

In step 205, a payment mechanism selection computer program may receive payment parameters for a payment from a payor to a payee. For example, the payor may identify a payment source (e.g., a payor account), a payment destination (e.g., a payee account, a payee name, a payee telephone number or email address, a payee address, a payee alias, etc.), and a payment amount. Additional information, such as a memo or reference to be included with the payment, may also be received.

In one embodiment, the payor may specify a desired payment mechanism for the payment. For example, the payor may select wire, check, credit, etc.

In step 210, the payment mechanism selection computer program may receive payment feature(s) associated with the payor's payment intent. For example, the payor may be presented with different payment mechanism features, such as payment speed (e.g., immediate, next day, two-day, etc.), a payment cost, a payment recallability, payment tracking ability, etc.

In one embodiment, the payor may be prompted to rank order payment mechanism features. In another embodiment, the payor may be prompted to select the most important payment mechanism feature. In still another embodiment, the payor may be prompted to ether criteria for one or more of the payment mechanism features, such as a date that the payment must be received by, a maximum cost, whether the payment needs to have recallability, whether the payment needs to be trackable, etc.

In one embodiment, the payment mechanism selection computer program may use a trained machine learning engine to predict the payor's payment intent. For example, the machine learning engine may be trained with historic transactions and may be trained to identify the payment intent from the payment features. For example, the payment mechanism selection computer program may present the prediction as default rankings, selections, etc.

In step 215, the payment mechanism selection computer program may determine the payor's payment intent from payment feature(s). For example, based on the payor's input, the payment mechanism may identify the payor's intent (speed, cost, tracking, or recallability) for the payment.

In step 220, the payment mechanism selection computer program may select the optimal payment mechanism(s) from available payment mechanisms for the payor's payment intent. In one embodiment, the payment mechanism selection computer program may apply rules to the features to select the appropriate payment mechanism(s).

In one embodiment, more than one payment mechanisms may be selected.

In one embodiment, the payment mechanism selection computer program may determine which payment mechanisms are available based on the information received from the payor. For example, if the payor provided a payee telephone number, the payment mechanism selection computer program may use the telephone number to identify a P2P token (e.g., a ZELLE token) or account for the payee.

Other information, such as the payee's check information (e.g., name, address, checking routing number, checking account number), billpay information (e.g., name, address, and phone number), wiring information (e.g., routing number and account number for the wire payment), etc. may be used to identify a P2P token or account for the payee.

In one embodiment, the payment mechanism(s) selected may not be the same as the payment mechanism that was identified by the payor. In one embodiment, the payment mechanism selection computer program may provide an explanation as to why the payment mechanisms may differ.

In step 225, the payment mechanism selection computer program may optionally confirm the payment mechanism selection with the payor. For example, the payment mechanism selection computer program may present the payment mechanism(s), the speed, and the cost for the payment mechanism(s). The payor may accept the selection or may modify the payment mechanism features to have a different payment mechanism selection recommended.

In step 230, the payment mechanism selection computer program may route the payment to the selected payment mechanism(s). In one embodiment, the payment mechanism selection computer program may provide details on the payment progress to the payor during the course of the payment.

Figure 3:
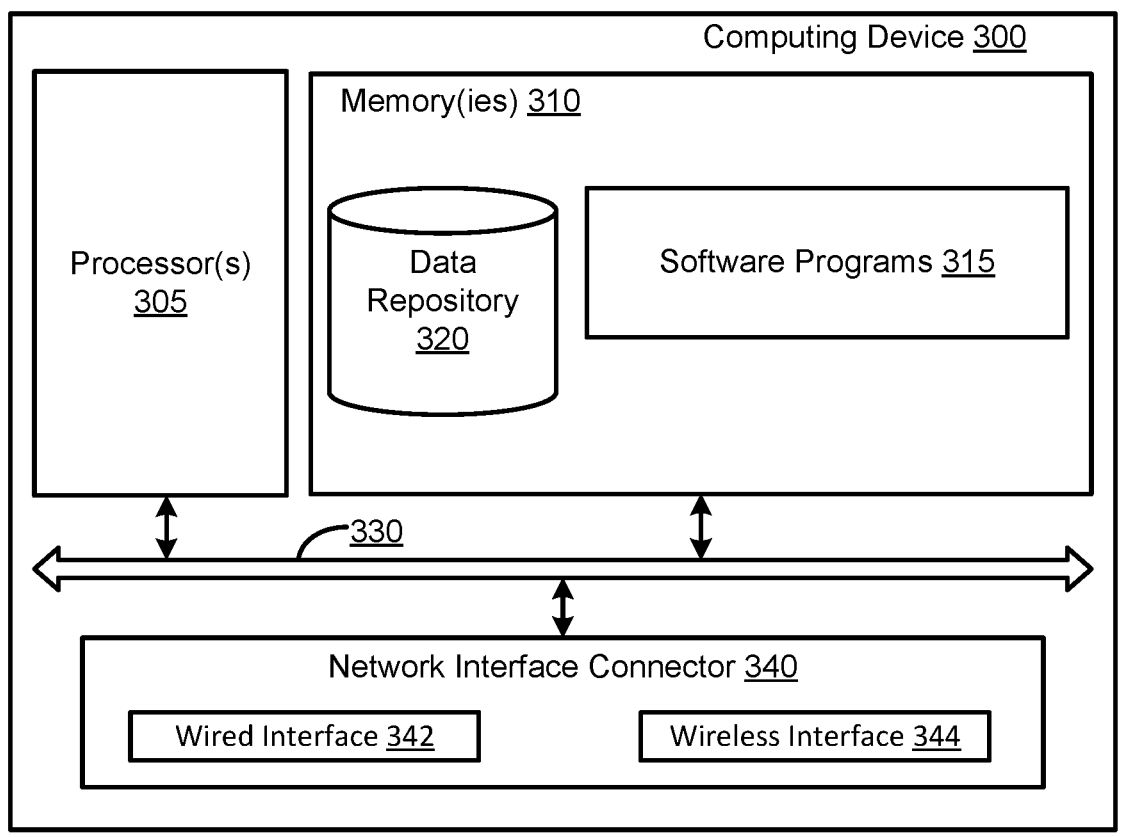
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for dynamically identifying payment mechanisms for outgoing payments, comprising:
    receiving, by a payment mechanism selection computer program, a payment request from an electronic device associated with a payor to pay a payee comprising payment parameters;
    presenting, by the payment mechanism selection computer program, a plurality of payment features to the payor electronic device;
    receiving, by the payment mechanism computer program and from the payor electronic device, a selection of a subset of the plurality of payment features and a ranking of the payment features in the subset, wherein the subset of the plurality of payment features and the ranking of the payment features in the subset are associated with a payor payment intent;
    predicting, by the payment mechanism selection computer program and using a machine learning engine that is trained with historical transactions to identify payment intents from the payment features, a payor payment intent from the selection and the ranking of the subset of payment features;
    dynamically disabling, by the payment mechanism selection computer program, selection of one of the plurality of payment features that are inconsistent with the payor payment intent, wherein the one payment feature is dynamically disabled by removing the one payment feature from the presentation of the plurality of payment features, or by graying-out the one payment feature in the presentation of the plurality of payment features where the one payment feature cannot be selected;
    identifying, by the payment mechanism selection computer program, a plurality of available payment mechanisms based on the payment parameters;
    selecting, by the payment mechanism selection computer program, a selected payment mechanism from the plurality of available payment mechanisms that is consistent with the payor payment intent; and
    executing, by the payment mechanism selection computer program, the payment using the selected payment mechanism.

2. The method of claim 1, wherein the payment parameters comprises a payment source, a payment destination, and a payment account.

3. The method of claim 2, wherein the payment destination comprises a payee name and a payee phone number.

4. The method of claim 2, wherein the payment destination comprises a payee checking account routing number and a payee checking account number.

5. The method of claim 2, wherein the payment destination comprises a payee wiring account routing number and a payee wiring account number.

6. The method of claim 1, wherein the payment features comprise a payment speed, a payment cost, a payment recallability, and a payment tracking ability.

7. A non-transitory computer readable storage medium, including instructions stored thereon, which when read and executed by one or more computer processors, cause the one or more computer processors to perform steps comprising:
    receiving a payment request from an electronic device associated with a payor to pay a payee comprising payment parameters;
    presenting a plurality of payment features to the payor electronic device;
    receiving, from the payor electronic device, a selection of a subset of the plurality of payment features and a ranking of the payment features in the subset, wherein the subset of the plurality of payment features and the ranking of the payment features in the subset are associated with a payor payment intent;
    predicting, using a machine learning engine that is trained with historical transactions to identify payment intents from the payment features, a payor payment intent from the selection and the ranking of the subset of payment features;
    dynamically disabling selection of one of the plurality of payment features that are inconsistent with the payor payment intent, wherein the one payment feature is dynamically disabled by removing the one payment feature from the presentation of the plurality of payment features, or by graying-out the one payment feature in the presentation of the plurality of payment features where the one payment feature cannot be selected;
    identifying a plurality of available payment mechanisms based on the payment parameters;
    selecting a selected payment mechanism from the plurality of available payment mechanisms that is consistent with the payor payment intent; and
    executing the payment using the selected payment mechanism.

8. The non-transitory computer readable storage medium of claim 7, wherein the payment parameters comprises a payment source, a payment destination, and a payment account.

9. The non-transitory computer readable storage medium of claim 8, wherein the payment destination comprises a payee name and a payee phone number.

10. The non-transitory computer readable storage medium of claim 8, wherein the payment destination comprises a payee checking account routing number and a payee checking account number.

11. The non-transitory computer readable storage medium of claim 8, wherein the payment destination comprises a payee wiring account routing number and a payee wiring account number.

12. The non-transitory computer readable storage medium of claim 7, wherein the payment features comprise a payment speed, a payment cost, a payment recallability, and a payment tracking ability.

13. A system, comprising:
    a payor electronic device executing a payor computer program that submits a payment request to pay a payee comprising payment parameters, parameters comprising a payment source, a payment destination, and a payment account;

a plurality of available payment mechanisms; and a payment mechanism selection computer program executed by an electronic device that presents a plurality of payment features to the payor computer program and receives a selection of a subset of the plurality of payment features and a ranking of the payment features in the subset from the payor computer program, wherein the subset of the plurality of payment features and the ranking of the payment features in the subset are associated with a payor payment intent, predicts a payor payment intent from the selection and the ranking of the subset of payment features using a machine learning engine that is trained with historical transactions to identify payment intents from the payment features, dynamically disables selection of one of the plurality of payment features that are inconsistent with the payor payment intent, wherein the one payment feature is dynamically disabled by removing the one payment feature from the presentation of the plurality of payment features, or by graying-out the one payment feature in the presentation of the plurality of payment features where the one payment feature cannot be selected, identifies the plurality of available payment mechanisms based on the payment parameters, selects a selected payment mechanism from the plurality of available payment mechanisms that is consistent with the payor payment intent, and executes the payment using the selected payment mechanism.

14. The system of claim 13, wherein the payment destination comprises a payee name and a payee phone number.

15. The system of claim 13, wherein the payment destination comprises a payee checking account routing number and a payee checking account number.

16. The system of claim 13, wherein the payment features comprise a payment speed, a payment cost, a payment recallability, and a payment tracking ability.

17. The method of claim 1, further comprising:
receiving, by the payment mechanism selection computer program and with the payment request, an initial payment mechanism selection, wherein the initial payment mechanism selection is different from the selected payment mechanism; and
dynamically changing, by the payment mechanism selection computer program, the initial payment mechanism selection to the selected payment mechanism.

18. The non-transitory computer readable storage medium of claim 7, further including instructions stored thereon, which when read and executed by one or more computer processors, cause the one or more computer processors to perform steps comprising:
receiving with the payment request, an initial payment mechanism selection, wherein the initial payment mechanism selection is different from the selected payment mechanism; and
dynamically changing the initial payment mechanism selection to the selected payment mechanism.

19. The system of claim 13, wherein the payment mechanism selection computer program further receives, with the payment request, an initial payment mechanism selection, wherein the initial payment mechanism selection is different from the selected payment mechanism, and dynamically changes the initial payment mechanism selection to the selected payment mechanism.

* * * * *